United States Patent
Cariello

(10) Patent No.: US 10,459,845 B1
(45) Date of Patent: Oct. 29, 2019

(54) HOST ACCELERATED OPERATIONS IN MANAGED NAND DEVICES

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/023,338

(22) Filed: Jun. 29, 2018

(51) Int. Cl.
- *G06F 12/10* (2016.01)
- *H04L 9/32* (2006.01)
- *H04L 9/08* (2006.01)

(52) U.S. Cl.
CPC .......... *G06F 12/10* (2013.01); *H04L 9/0869* (2013.01); *H04L 9/0894* (2013.01); *H04L 9/3278* (2013.01); *G06F 2212/1024* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,924,686 B2 * | 12/2014 | Persson | G06F 12/1027 711/216 |
| 2013/0042060 A1 * | 2/2013 | Marukame | G06F 12/0246 711/108 |
| 2016/0364343 A1 * | 12/2016 | Case | G09C 1/00 |
| 2018/0239697 A1 * | 8/2018 | Huang | G06F 12/0246 |
| 2019/0042402 A1 * | 2/2019 | Chhabra | G06F 12/0215 |

\* cited by examiner

*Primary Examiner* — Michael Alsip
(74) *Attorney, Agent, or Firm* — Schwegman Lundberg & Woessner, P.A.

(57) ABSTRACT

Devices and techniques for host accelerated operations in managed NAND devices are described herein. A controller can receive an operation. Here, the operation includes address data with a logical address portion and a physical address portion. The controller can then extract an index value and a location value from the physical address portion. The controller can retrieve a key using the index value and invoke a reversible function—using the index value and the location value—to produce a physical address. The controller can then perform the operation using the physical address.

21 Claims, 6 Drawing Sheets

HOST ACCELERATED OPERATIONS IN MANAGED NAND DEVICES

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
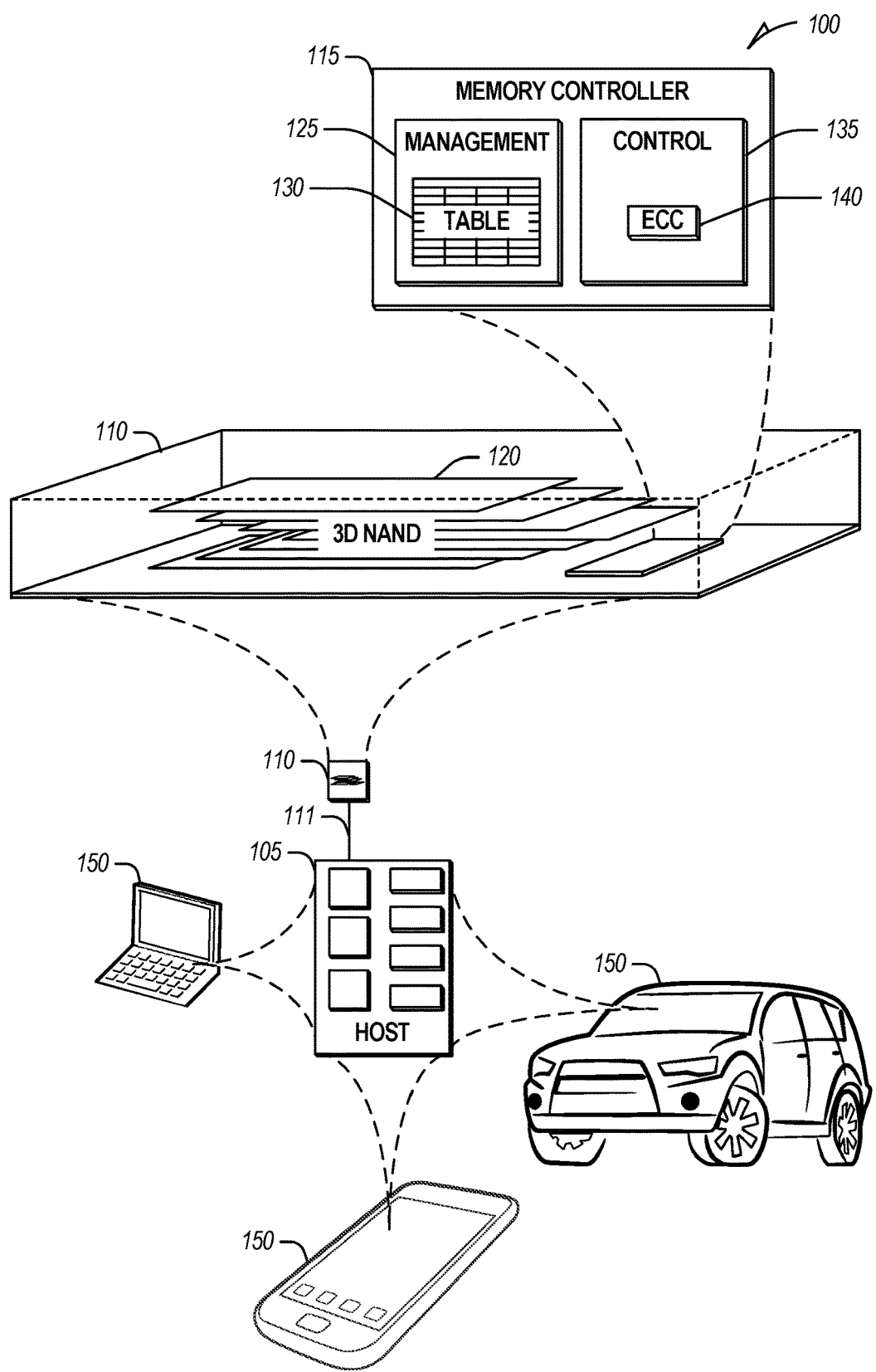
FIG. 1 illustrates an example of an environment including a memory device.

Many storage devices, such as flash devices, use translation tables to map logical elements (e.g., pages or blocks) to the physical equivalents of the logical elements. This allows the controller of the device to perform a variety of technique to increase the performance of, or longevity of, the storage elements of the device. For example, NAND flash cells experience physical wear with write or erase cycles. Further, these devices require many elements to be erased at one time (e.g., block erasure). To address these issues, the controller generally spreads writes around available cells (e.g., to reduce wearing out of these cells) and migrates good pages from blocks to erase the block and thus free additional space. In both cases, a host address for a given page or block can be constant even though the data to which it refers is moved to different physical pages or blocks by virtue of the translation table.

Translation tables are generally loaded into an internal memory of the controller. If the table size is greater than the internal memory (e.g., in random access memory (RAM), such as dynamic RAM (DRAM) or static RAM (SRAM) of the controller, a portion of the table is loaded into the internal memory and the remainder of the table is stored in other storage (such as NAND flash array elements). If a translation request (e.g., a logical-to-physical (L2P) mapping) is not in the internal memory, the controller replaces the internal memory portion of the table with the appropriate portion from other storage. This process can increase latencies when performing operations such as reading or writing to the storage device. Although increased internal memory can reduce these occurrences, this comes at a manufacturing and power cost that can be unacceptable for a given application.

To address the issue of swapping portions of the translation tables into and out of internal memory, the translation tables can be delivered to a host (with presumably greater memory resources than the storage device), allowing the host to indicate which physical address a given operation applies. Such a technique can be called a host resident translation table system (HRTTS), a form of host accelerated operations in managed NAND. In this arrangement, the controller is ultimately responsible for maintaining the translation tables and updating the host with changes to the translation tables, but the host actually provides the controller with the physical addresses to be operated upon. Here, the controller can avoid referencing the translation tables when actually performing an operation, increasing efficiency or decreasing latency when performing the operation.

Current HRTTS proposals include several drawbacks. For example, the host memory is outside the control of the controller. Thus, manipulations of the L2P mappings by the host can circumvent data protection implemented by the controller. Accordingly, malicious or defective software of the host can corrupt the data on the storage device in ways not possible when the controller relies solely on its internal translation tables.

What is needed is a technique to exploit the advantages of HRTTS while also enabling controller mastery over the physical address access controllers typically have in non-HRTTS systems, to, preventing unauthorized modification of data, and possibly to protect proprietary operations of the storage device, such as wear leveling techniques. These goals can be accomplished by scrambling the physical address when delivering it to the host and descrambling the physical address when it comes back from the host in an HRTTS request. Standard encryption of the physical address can be too cumbersome, both in terms of storage and processing, for this purpose. Rather, a random number can be used to perform the scrambling, the random number tracked with each scrambled physical address. To facilitate this tracking, the generally excessive number of physical address bits available in an HRTTS request are used. Generally, HRTTS provides eight bytes for the physical address. Also, it is often the case that only four bytes are used for the physical address. Here, the additional four bytes are leveraged to index the random number (e.g., or other key) used to scramble the four-byte physical address. Thus, a new value (e.g., random number) can be generated for every operation and stored in a data structure. The index into the data structure accompanies the scrambled physical address from the memory device to the host. In this way, the memory device can lookup the scrambling value used and reconstruct the physical address from the HRTTS request without revealing any internal organization to the physical address, and avoiding more expensive L2P table lookups (e.g., retaining much of the benefit from using HRTTS). The technique enables management of a virtually infinite number of scrambling (e.g., encryption) keys and reduces the memory device resources used by leveraging host memory for key storage. Due to the abundance of keys and their limited use (e.g., each key is used only once for a single physical address) it is possible to reduce the complexity of the encryption functions to improve the throughput or increase the robustness of the scrambling cypher. Additional details and examples are described below.

Devices employing the translation table modifications discussed herein can fit in many applications. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105. In these examples, the memory device 110 communicates with host device 105 components via an interlink 111, such as a bus. Thus, as described herein, a host, or host device 105 operation is distinct from those of the memory device 110, even when the memory device 110 is integrated into the host device 105.

One or more communication interfaces (e.g., the interlink 111) can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 600 of FIG. 6.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

With respect to translation, the memory controller 115 can implement a technique to implement HRTTS while still retaining control over physical addresses. To this end, the memory controller 115 is arranged to receive an operation (e.g., a read, a write, etc.). The operation (e.g., received via a message on a bus) includes address data. The address data includes a logical address portion and a physical address portion.

The memory controller 115 is arranged to extract an index value and a location value from the physical address portion of the address. In an example, the index value is four bytes. In an example, the location value is four bytes. In an example, the index value and the location value do not overlap. In an example, the four bytes of the index value begin an HRTTS address—e.g., an address that is sixteen bytes long, with bytes five through twelve used for the logical address portion, and bytes one through four and 13 through sixteen used for the physical address portion. In an example, the four bytes of the location value end an HRTTS address.

The memory controller 115 is arranged to retrieve a key (e.g., scrambling value, encryption key, etc.) using the index value. In an example, the index value is used to locate the key in a table store in volatile memory of the memory device 110, such as in a table 130 in the memory controller 115. Thus, the key can be used as a hash-key to a hash table, the bucket of the hash table being the key. In an example, the key can be an index into an array, with the value at the index being the key. There are numerous other data structures that can be used where the index value can be used to lookup the key.

In an example, retrieving the key using the index value includes extracting a logical address from the logical address portion and combining the logical address with the index value to locate the key. In this example, the key and the logical address together form the lookup value. However, their combination can include a bitwise combination (e.g., concatenation, XORing, etc.), or a multi-value lookup where, for example, the logical address is used to find a portion of the data structure and the index value is used to locate the specific key, or vice versa.

The memory controller 115 is arranged to invoke (e.g., execute on internal hardware or cause external hardware to execute) a reversible function using the key and the location value. The output of the reversible function is a physical address. The function is reversible in that, given the key and the physical address, the function produces the location value, whereas given the key and the location value, the function produces the physical address. In an example, the reversible function performs an XOR between the key and the location value to produce the physical address. In an example, the reversible function performs rotation (e.g., a circular shift, bitwise rotation, etc.) on the key and the location value to produce the physical address—for example, the key bits are concatenated (e.g., prepended or appended) onto the location value bits and shifted to arrive at the physical address; in the reverse operation, the shift is in the opposite direction. In an example, the reversible function performs permutation on the key and the location value to produce the physical address. Any reversible function can be used. Those with efficient implementations can provide better performance for the memory controller 115.

The memory controller 115 is arranged to perform the operation using the physical address. Using the physical address unscrambled (e.g., decoded) from the message achieves the efficiency benefits of HRTTS. Thus, the operation is performed without an L2P table lookup to match the logical address to the physical address.

In an example, the operation is a write request. Generally, due to the write characteristics of NAND flash, a write involves writing data for a logical address to a physical address that is different than the last physical address associated to the logical address. Thus, to perform the write operation, the memory controller 115 is arranged to write the data specified in the write request to a second physical address. To create a new key, the memory controller 115 is arranged to invoke a random number generator to create a random key. In an example, the random number generator is a physically unclonable function (PUF). The randomness of the PUF can be based on physical manufacturing variations, such as the startup values of an SRAM (e.g., the bit values of one or more cells have varying values when the SRAM is powered due to manufacturing and environmental characteristics of the device), and amplify the randomness of these physical variations. In an example, the PUF is implemented as hardware in the memory controller 115, or elsewhere in the memory device 110.

In an example, the PUF implementation can be weak, in that it accepts one input and is not perfectly repeatable (e.g., up to 30% flipping bits), resulting in the actual number of a random bits being low (e.g., as compared to other techniques). For example, the PUF can be an SRAM that, when powered up and due to process induced asymmetries, will be automatically initialized, more or less, to the same values. A solution for the weakness of such a PUF can include generating a random number and using it to scramble the input and the output of the PUF. For non-repeatability, power can be maintained to the PUF during standby (e.g., at a power consumption drawback), or an ECC can be calculated and saved to the array 120 (e.g., at a latency drawback), or a chunk of immutable pseudo-random data (e.g., as a value in firmware or ROM; at security drawback due to all parts being the same) can be used.

As noted above, the PUF can be avoided and the randomness performed by a random number generator (e.g., a standard portion of RAM can be initialized using the random number generator). However, this approach can be slower or use more power than the PUF. It is still, however, more efficient than implementing fast encryption in a memory controller 115 without dedicated encryption hardware and will generally be faster than software implemented encryption.

The memory controller 115 is arranged to store the random key in a data structure (e.g., the table mentioned above, such as table 130) with a second index value. Thus, the new key is stored, and an index to that storage is returned for inclusion future communications to the host 105. The memory controller 115 is arranged to invoke the reversible function on the second physical address using the random key to produce a second location value (e.g., scrambled version of the new physical address). The second location value and the second index value are provided to an initiator of the write request (e.g., the host 105). Thus, the new physical address is scrambled before it is sent to the host 105, while the host 105 maintains the index used to find the key when a new request is provided to the memory controller 115 later.

In an example, to store the random key in the data structure, the memory controller 115 is arranged to generate the second index value. In an example, the second index value is randomly generated by the PUF. Random generation of the index value can help further obfuscate the physical address by separating the index from the physical address. Thus, an attacker will not be able to recognize, for example, that index 1 corresponds to block 1, and attempt to ascertain the key.

As noted above, a disadvantage of sharing the translation tables with an outside entity, such as the host 105, is the possible disclosure of propriety techniques, such as wear leveling. For example, by observing changing logical and physical address relationships over time, the host 105 can determine a pattern to the physical address selected, timing of internal data moves, etc. It is not possible, however, to simply refrain from sharing these updates with the host 105 because the host 105 will provide incorrect physical addresses in its requests, resulting in data corruption or the need for the memory controller 115 to fall back on its own L2P mapping to determine the correct physical address.

The techniques described above address this problem by providing an external physical address to the host 105 that is different than, but allows derivation to, the actual physical address (e.g., an internal physical address). Further, the additional physical address bytes in an HRTTS compliant request can be used to find keys that exceed these excess bytes, ensuring a more robust scrambling of the physical address.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
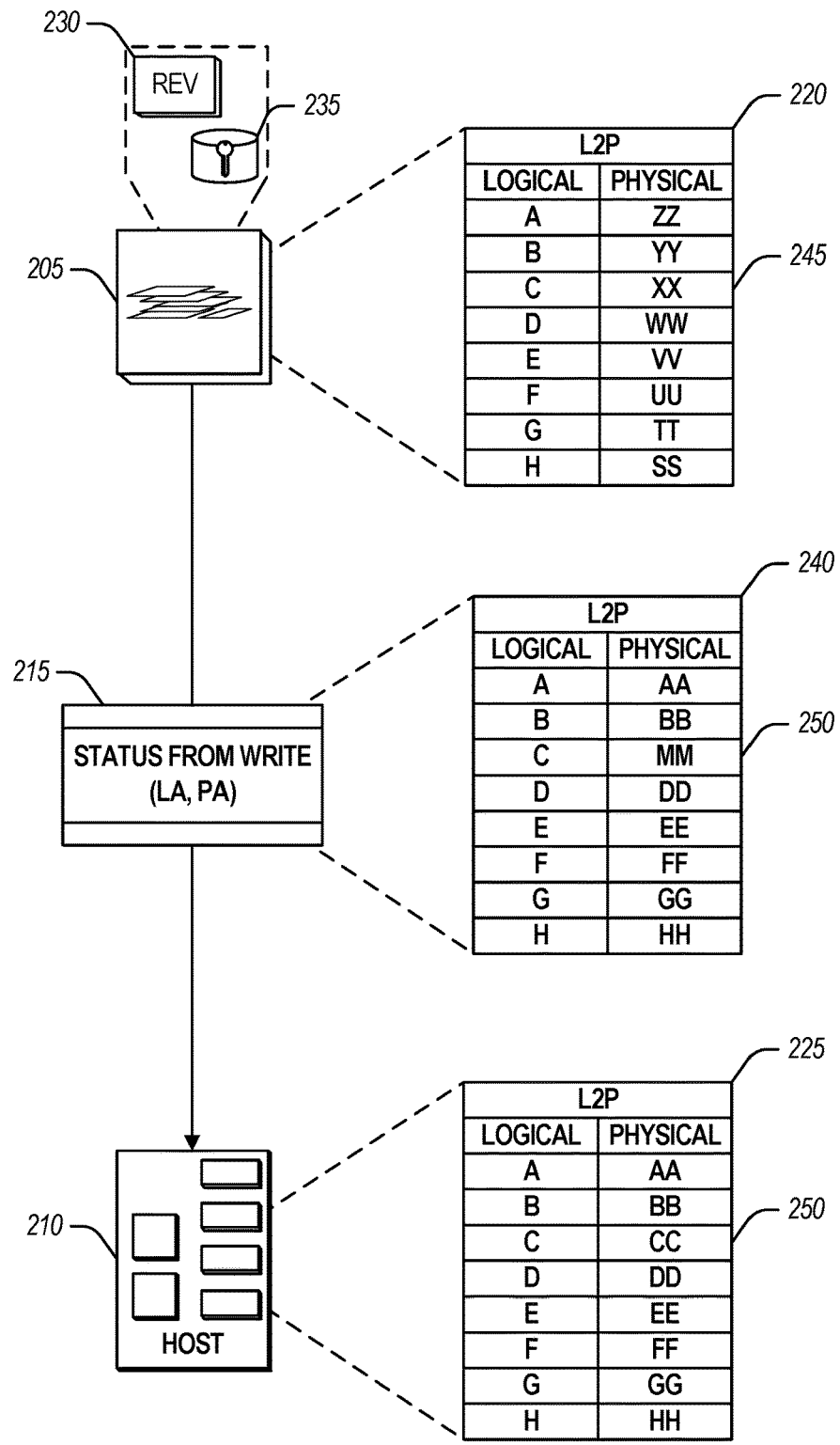
FIG. 2 illustrates an example of performing a write request.

FIG. 2 illustrates an example of performing a write request. Here, the memory device 205 has updated the physical address of logical address 'C' to 'XX'. This change is reflected in translation table 220 at element 245. However, the corresponding element 250 of translation table 225 held by the host 210 does not yet reflect the correct mapping (e.g., the translation table 225 is stale). To correct this, the memory device 205 provides a duplicate translation table 240 with the new entry 250 to the host 210 via a status message 215 produced in response to the write request. The host 210 can then update its translation table 225 for future requests.

The new entry 250 includes a physical address that is scrambled by the reversible function 230 and the key 235. Part of the physical address in the message 215 includes an index to find the key 235 for subsequent operations.

Figure 3:
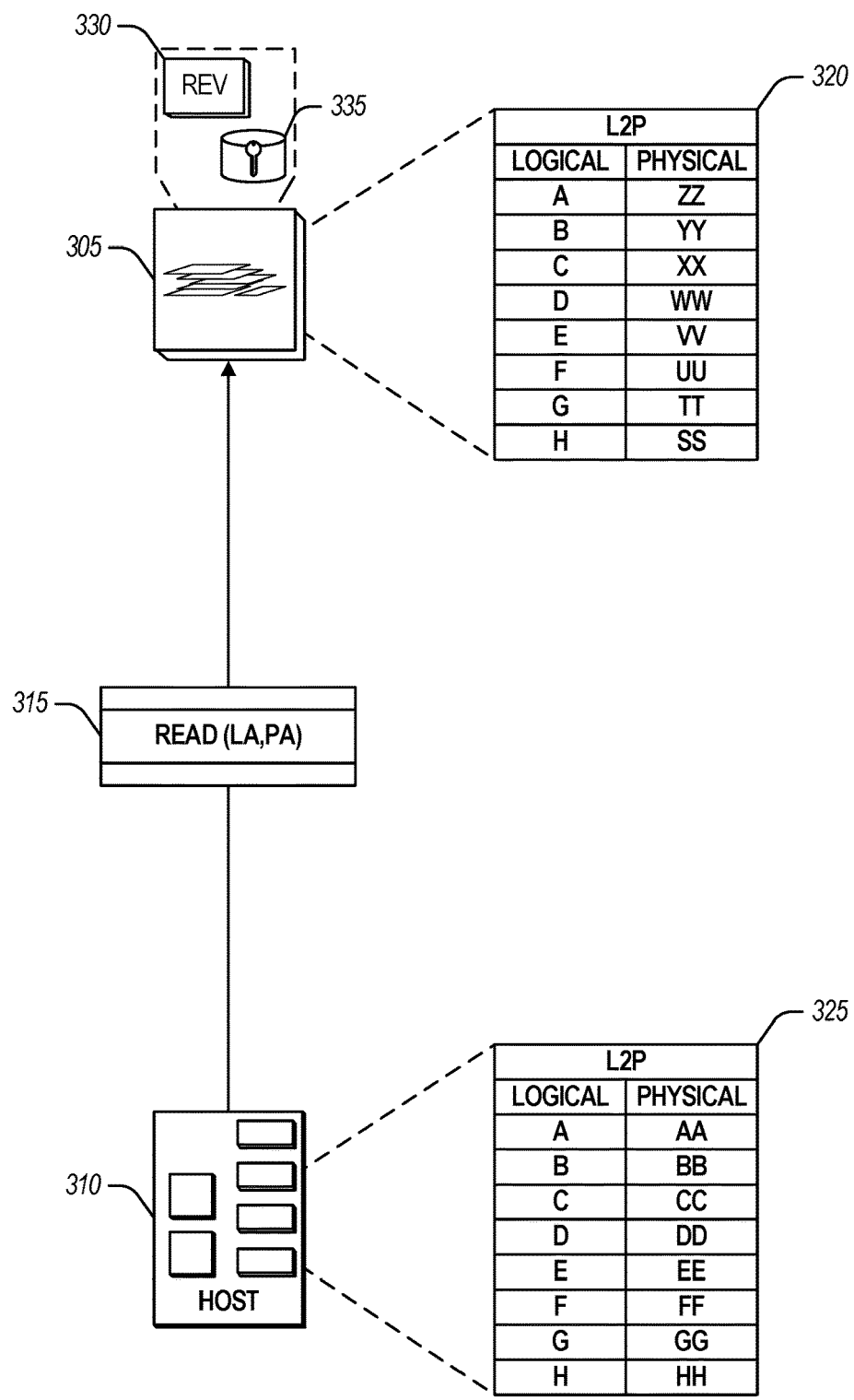
FIG. 3 illustrates an example of performing a read request.

FIG. 3 illustrates an example of performing a read request. As illustrated, the host 310 includes a copy of the translation table 325 for L2P mapping. The memory device 305 includes the same translation table 320, except that the physical addresses of the table 320 are the actual physical address and the physical addresses of the table 325 are scrambled.

As illustrated, the host 310 is making a read request 315 that includes the logical address and its version of the physical address—which, in this case, is a scrambled version of the physical address and an index that the controller 305 can use to lookup the key 335. The controller 305 uses the index to retrieve the key and uses the key and the reversible function 330 to un-scramble the physical address provided by the host 310 into the actual physical address. Once complete, the controller 305 can perform the read without referencing the table 320.

Figure 4:
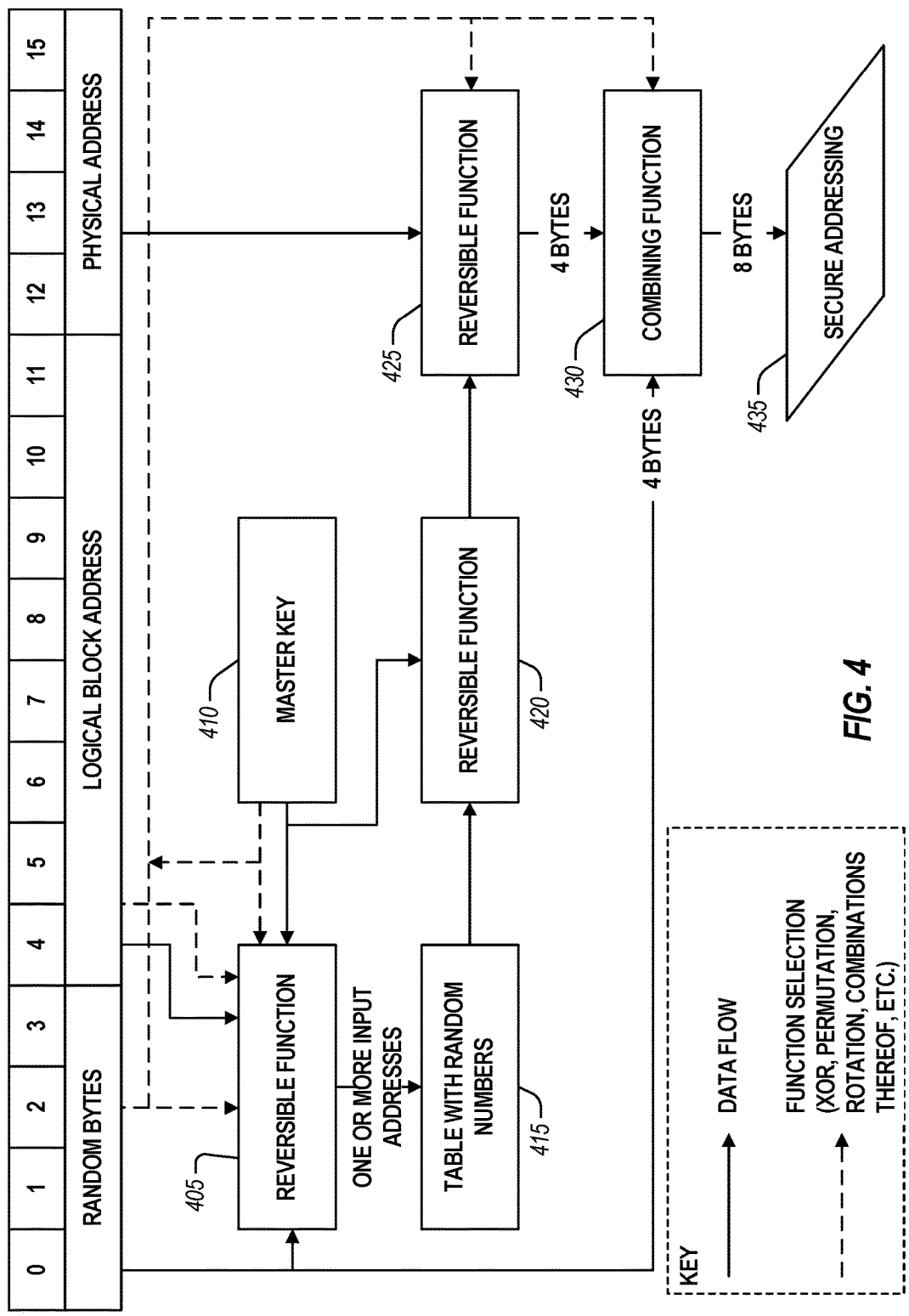
FIG. 4 illustrates an example of a control flow to scramble physical addresses for host consumption.

FIG. 4 illustrates an example of a control flow to scramble physical addresses for host consumption. As illustrated, the address bytes for an HRTTS request include an eight-byte logical address and two four-byte areas for the physical address. Here, the first four bytes are the randomly generated, and the last four bytes are the physical address. The control flow illustrates the production of the scrambled physical address that will be used by the host in a future operation (e.g., either a read or a write).

The random bytes are combined with the logical address bytes and a master key 410 to produce an index by reversible function 405. The index is used to lookup a key in the table 415 and provide the key to a second reversible function 420, along with the master key 410. The result of the second reversible function 420 is provided to a third reversible function 425, along with the physical address bytes. The output of the third reversible function 425 is combined in combination function 430 (e.g., XORed) to the random bytes to produce an eight-byte secure addressing value 435 that is presented to the host as the physical address. A reverse process when the host presents the physical process efficiently reproduces the physical address bytes and enables the memory controller to perform the operation.

Figure 5:
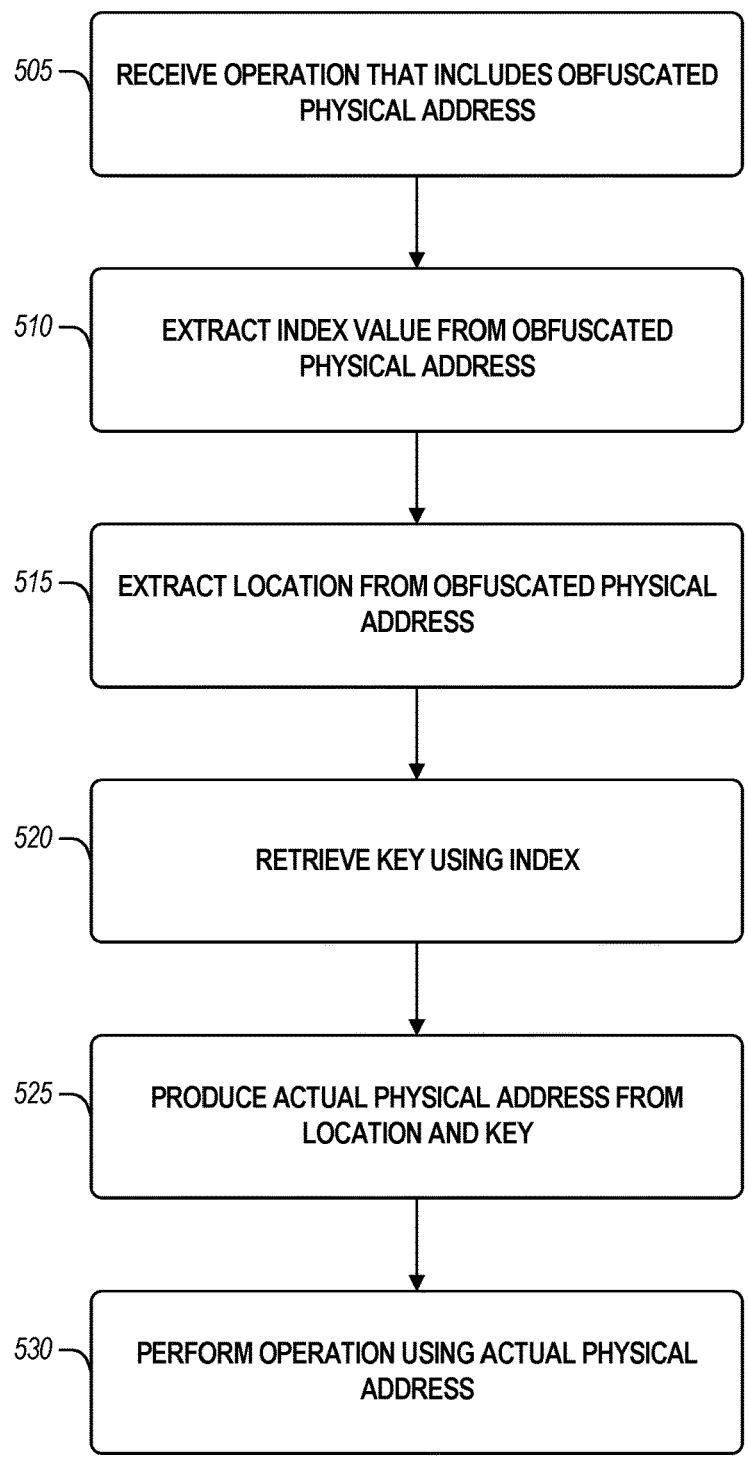
FIG. 5 illustrates a flowchart of a method for host accelerated operations in managed NAND devices.

FIG. 5 illustrates a flowchart of a method 500 for host accelerated operations in managed NAND devices. The operations of the method 500 are performed on hardware, such as that described above or below (e.g., processing circuitry).

At operation 505, an operation (e.g., request, command, etc.) is received (e.g., at a controller of a NAND device). Here, the received operation (e.g., message indicating what operation to perform) includes address data. The address data includes with a logical address portion and a physical address portion.

At operation 510, an index value is extracted from the physical address portion. In an example, the index value is four bytes. In an example, the four bytes of the index value begin an HRTTS address.

At operation 515, a location value is extracted from the physical address portion. In an example, the location value is four bytes. In an example, the four bytes of the location value end an HRTTS address.

At operation 520, a key is retrieved using the index value. In an example, the index value is used to locate the key in a table store in volatile memory of the NAND device. In an example, retrieving the key using the index value includes extracting a logical address from the logical address portion and combining the logical address with the index value to locate the key.

At operation 525, a reversible function using the key and the location value is invoked to produce a physical address. In an example, the reversible function performs an XOR between the key and the location value to produce the physical address. In an example, the reversible function performs rotation on the key and the location value to produce the physical address. In an example, the reversible function performs permutation on the key and the location value to produce the physical address.

At operation 530, the operation is performed using the physical address. In an example, the operation is a write request. Here, performing the operation includes writing data of the write request to a second physical address, invoking a PUF to create a random key, storing the random key in a data structure with a second index value, invoking the reversible function on the second physical address using the random key to produce a second location value, and providing the second location value and the second index value to an initiator of the write request. In an example, storing the random key in the data structure includes generating the second index value. In an example, the second index value is randomly generated by the PUF. In an example, the PUF is implemented in hardware of a controller of the NAND device.

Figure 6:
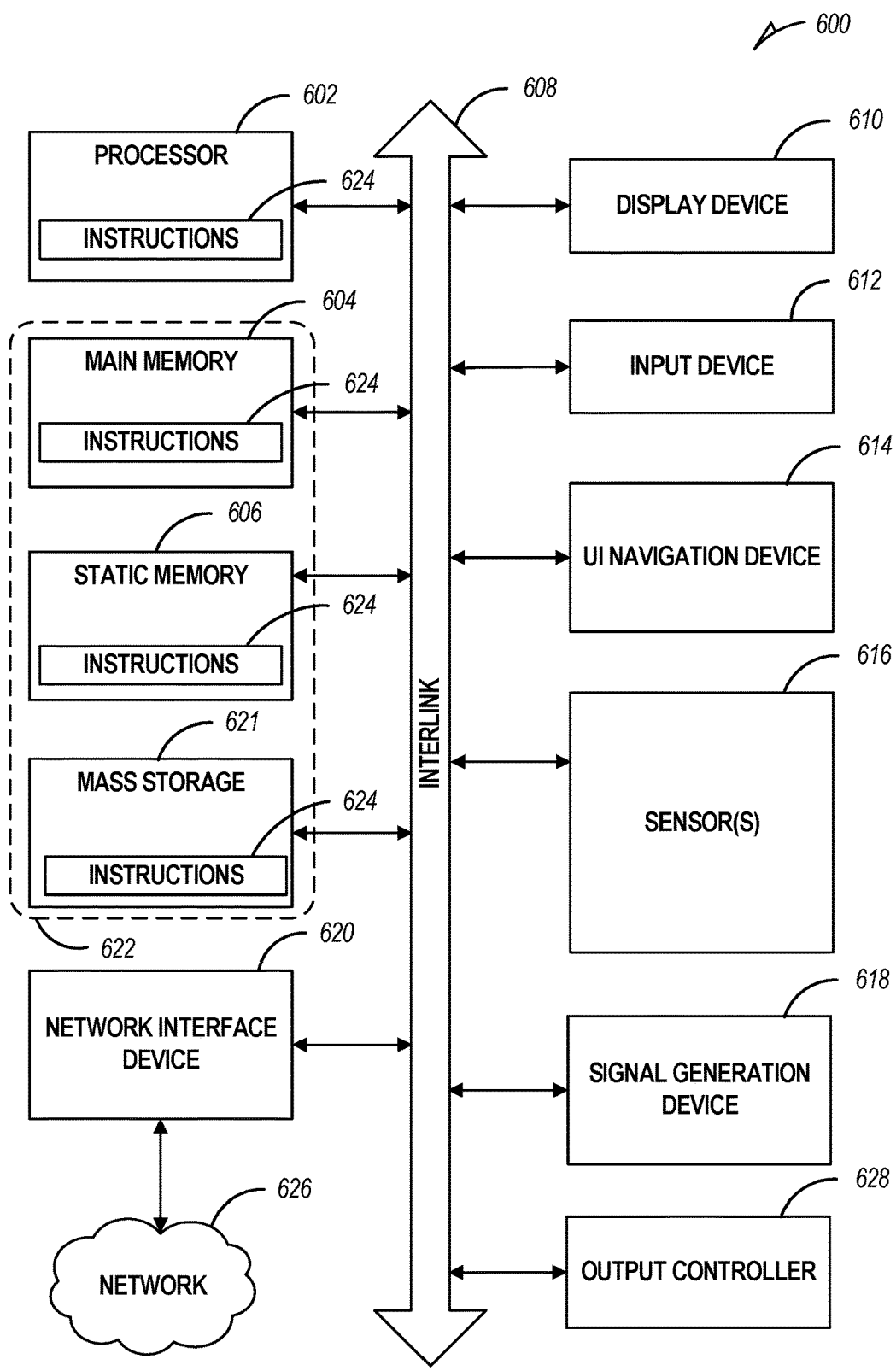
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 600 (e.g., the host device 105, the memory device 110, etc.) can include a hardware processor 602 (e.g., a central processing unit (CPU), a graphics processing unit (GPU), a hardware processor core, or any combination thereof, such as the memory controller 115, etc.), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 616, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute the machine readable medium 622.

While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data are stored on the storage device 621, can be accessed by the memory 604 for use by the processor 602. The memory 604 (e.g., DRAM) is typically fast, but volatile, and thus a different type of storage than the storage device 621 (e.g., an SSD), which is suitable for long-term storage, including while in an "off" condition. The instructions 624 or data in use by a user or the machine 600 are typically loaded in the memory 604 for use by the processor 602. When the memory 604 is full, virtual space from the storage device 621 can be allocated to supplement the memory 604; however, because the storage 621 device is typically slower than the memory 604, and write speeds are typically at least twice as slow as read speeds, use of virtual memory can greatly reduce user experience due to storage device latency (in contrast to the memory 604, e.g., DRAM). Further, use of the storage device 621 for virtual memory can greatly reduce the usable lifespan of the storage device 621.

In contrast to virtual memory, virtual memory compression (e.g., the Linux® kernel feature "ZRAM") uses part of the memory as compressed block storage to avoid paging to the storage device 621. Paging takes place in the compressed block until it is necessary to write such data to the storage device 621. Virtual memory compression increases the usable size of memory 604, while reducing wear on the storage device 621.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 600, and includes digital or analog communications signals or other intangible medium to facilitate communication of such software.

Additional Examples

Example 1 is a device for host accelerated operations in managed NAND devices, the device comprising: a machine readable medium including a data structure with keys; and a controller to: receive an operation, the operation including address data with a logical address portion and a physical address portion; extract an index value from the physical address portion; extract a location value from the physical address portion; retrieve a key from the data structure using the index value; invoke a reversible function using the index value and the location value to produce a physical address; and perform the operation using the physical address.

In Example 2, the subject matter of Example 1, wherein the reversible function performs an exclusive-or (XOR) between the key and the location value to produce the physical address.

In Example 3, the subject matter of any of Examples 1-2, wherein the reversible function performs rotation on the key and the location value to produce the physical address.

In Example 4, the subject matter of any of Examples 1-3, wherein the reversible function performs permutation on the key and the location value to produce the physical address.

In Example 5, the subject matter of any of Examples 1-4, wherein the index value is four bytes.

In Example 6, the subject matter of Example 5, wherein the four bytes of the index value begin a HRTTS address.

In Example 7, the subject matter of any of Examples 1-6, wherein the location value is four bytes.

In Example 8, the subject matter of any of Examples 5-7, wherein the four bytes of the location value end a HRTTS address.

In Example 9, the subject matter of any of Examples 1-8, wherein the data structure is a table store, and wherein the machine readable medium is volatile memory.

In Example 10, the subject matter of Example 9, wherein, to retrieve the key using the index value, the controller: extracts a logical address from the logical address portion; and combines the logical address with the index value to locate the key.

In Example 11, the subject matter of any of Examples 1-10, wherein the operation is a write request, and wherein, to perform the operation, the controller: writes data of the write request to a second physical address; invokes a physically unclonable function (PUF) to create a random key; stores the random key in the data structure with a second index value; invokes the reversible function on the second physical address using the random key to produce a second location value; and provides the second location value and the second index value to an initiator of the write request.

In Example 12, the subject matter of Example 11, wherein, to store the random key in the data structure, the controller generates the second index value.

In Example 13, the subject matter of Example 12, wherein the second index value is randomly generated by the PUF.

In Example 14, the subject matter of any of Examples 11-13, wherein the PUF is implemented in hardware of a controller of the NAND device.

Example 15 is a method for host accelerated operations in managed NAND devices, the method comprising: receiving an operation at a controller of a NAND device, the operation including address data with a logical address portion and a physical address portion; extracting an index value from the physical address portion; extracting a location value from the physical address portion; retrieving a key using the index value; invoking a reversible function using the index value and the location value to produce a physical address; and performing the operation using the physical address.

In Example 16, the subject matter of Example 15, wherein the reversible function performs an exclusive-or (XOR) between the key and the location value to produce the physical address.

In Example 17, the subject matter of any of Examples 15-16, wherein the reversible function performs rotation on the key and the location value to produce the physical address.

In Example 18, the subject matter of any of Examples 15-17, wherein the reversible function performs permutation on the key and the location value to produce the physical address.

In Example 19, the subject matter of any of Examples 15-18, wherein the index value is four bytes.

In Example 20, the subject matter of Example 19, wherein the four bytes of the index value begin a HRTTS address.

In Example 21, the subject matter of any of Examples 15-20, wherein the location value is four bytes.

In Example 22, the subject matter of any of Examples 19-21, wherein the four bytes of the location value end a HRTTS address.

In Example 23, the subject matter of any of Examples 15-22, wherein retrieving the key using the index value includes using the index value to locate the key in a table store in volatile memory of the NAND device.

In Example 24, the subject matter of Example 23, wherein retrieving the key using the index value includes: extracting a logical address from the logical address portion; and combining the logical address with the index value to locate the key.

In Example 25, the subject matter of any of Examples 15-24, wherein the operation is a write request, and wherein performing the operation includes: writing data of the write request to a second physical address; invoking a physically unclonable function (PUF) to create a random key; storing the random key in a data structure with a second index value; invoking the reversible function on the second physical address using the random key to produce a second location value; and providing the second location value and the second index value to an initiator of the write request.

In Example 26, the subject matter of Example 25, wherein storing the random key in the data structure includes generating the second index value.

In Example 27, the subject matter of Example 26, wherein the second index value is randomly generated by the PUF.

In Example 28, the subject matter of any of Examples 25-27, wherein the PUF is implemented in hardware of a controller of the NAND device.

Example 29 is a machine readable medium including instructions for host accelerated operations in managed NAND devices, the instructions, when executed by processing circuitry of a machine, cause the processing circuitry to perform operations comprising: receiving an operation at a controller of a NAND device, the operation including address data with a logical address portion and a physical address portion; extracting an index value from the physical address portion; extracting a location value from the physical address portion; retrieving a key using the index value; invoking a reversible function using the index value and the location value to produce a physical address; and performing the operation using the physical address.

In Example 30, the subject matter of Example 29, wherein the reversible function performs an exclusive-or (XOR) between the key and the location value to produce the physical address.

In Example 31, the subject matter of any of Examples 29-30, wherein the reversible function performs rotation on the key and the location value to produce the physical address.

In Example 32, the subject matter of any of Examples 29-31, wherein the reversible function performs permutation on the key and the location value to produce the physical address.

In Example 33, the subject matter of any of Examples 29-32, wherein the index value is four bytes.

In Example 34, the subject matter of Example 33, wherein the four bytes of the index value begin a HRTTS address.

In Example 35, the subject matter of any of Examples 29-34, wherein the location value is four bytes.

In Example 36, the subject matter of any of Examples 33-35, wherein the four bytes of the location value end a HRTTS address.

In Example 37, the subject matter of any of Examples 29-36, wherein retrieving the key using the index value includes using the index value to locate the key in a table store in volatile memory of the NAND device.

In Example 38, the subject matter of Example 37, wherein retrieving the key using the index value includes: extracting a logical address from the logical address portion; and combining the logical address with the index value to locate the key.

In Example 39, the subject matter of any of Examples 29-38, wherein the operation is a write request, and wherein performing the operation includes: writing data of the write request to a second physical address; invoking a physically unclonable function (PUF) to create a random key; storing the random key in a data structure with a second index value; invoking the reversible function on the second physical address using the random key to produce a second location value; and providing the second location value and the second index value to an initiator of the write request.

In Example 40, the subject matter of Example 39, wherein storing the random key in the data structure includes generating the second index value.

In Example 41, the subject matter of Example 40, wherein the second index value is randomly generated by the PUF.

In Example 42, the subject matter of any of Examples 39-41, wherein the PUF is implemented in hardware of a controller of the NAND device.

Example 43 is a system for host accelerated operations in managed NAND devices, the system comprising: means for receiving an operation at a controller of a NAND device, the operation including address data with a logical address portion and a physical address portion; means for extracting an index value from the physical address portion; means for extracting a location value from the physical address portion; means for retrieving a key using the index value; means for invoking a reversible function using the index value and the location value to produce a physical address; and means for performing the operation using the physical address.

In Example 44, the subject matter of Example 43, wherein the reversible function performs an exclusive-or (XOR) between the key and the location value to produce the physical address.

In Example 45, the subject matter of any of Examples 43-44, wherein the reversible function performs rotation on the key and the location value to produce the physical address.

In Example 46, the subject matter of any of Examples 43-45, wherein the reversible function performs permutation on the key and the location value to produce the physical address.

In Example 47, the subject matter of any of Examples 43-46, wherein the index value is four bytes.

In Example 48, the subject matter of Example 47, wherein the four bytes of the index value begin a HRTTS address.

In Example 49, the subject matter of any of Examples 43-48, wherein the location value is four bytes.

In Example 50, the subject matter of any of Examples 47-49, wherein the four bytes of the location value end a HRTTS address.

In Example 51, the subject matter of any of Examples 43-50, wherein the means for retrieving the key using the index value include means for using the index value to locate the key in a table store in volatile memory of the NAND device.

In Example 52, the subject matter of Example 51, wherein the means for retrieving the key using the index value include: means for extracting a logical address from the logical address portion; and means for combining the logical address with the index value to locate the key.

In Example 53, the subject matter of any of Examples 43-52, wherein the operation is a write request, and wherein the means for performing the operation include: means for writing data of the write request to a second physical address; means for invoking a physically unclonable function (PUF) to create a random key; means for storing the random key in a data structure with a second index value; means for invoking the reversible function on the second physical address using the random key to produce a second location value; and means for providing the second location value and the second index value to an initiator of the write request.

In Example 54, the subject matter of Example 53, wherein the means for storing the random key in the data structure include means for generating the second index value.

In Example 55, the subject matter of Example 54, wherein the second index value is randomly generated by the PUF.

In Example 56, the subject matter of any of Examples 53-55, wherein the PUF is implemented in hardware of a controller of the NAND device.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A device for host accelerated operations in managed NAND devices, the device comprising:
a machine readable medium including a data structure with keys; and
a controller configured to:
receive an operation, the operation including address data with a logical address portion and a physical address portion;
extract an index value from the physical address portion;
extract a location value from the physical address portion;
retrieve a key from the data structure using the index value;
invoke a reversible function using the index value and the location value to produce a physical address; and
perform the operation using the physical address.

2. The device of claim 1, wherein the reversible function performs permutation on the key and the location value to produce the physical address.

3. The device of claim 1, wherein the data structure is a table store, and wherein the machine readable medium is volatile memory.

4. The device of claim 3, wherein, to retrieve the key using the index value, the controller is configured to:
extract a logical address from the logical address portion; and
combine the logical address with the index value to locate the key.

5. The device of claim 1, wherein the operation is a write request, and wherein, to perform the operation, the controller is configured to:
write data of the write request to a second physical address;
invoke a physically unclonable function (PUF) to create a random key;
store the random key in the data structure with a second index value;
invoke the reversible function on the second physical address using the random key to produce a second location value; and
provide the second location value and the second index value to an initiator of the write request.

6. The device of claim 5, wherein, to store the random key in the data structure, the controller is configured to generate the second index value.

7. The device of claim 5, wherein the PUF is implemented in hardware of a controller of the NAND device.

8. A method for host accelerated operations in managed NAND devices, the method comprising:
receiving an operation at a controller of a NAND device, the operation including address data with a logical address portion and a physical address portion;
extracting an index value from the physical address portion;
extracting a location value from the physical address portion;
retrieving a key using the index value;
invoking a reversible function using the index value and the location value to produce a physical address; and
performing the operation using the physical address.

9. The method of claim 8, wherein the reversible function performs permutation on the key and the location value to produce the physical address.

10. The method of claim 8, wherein retrieving the key using the index value includes using the index value to locate the key in a table store in volatile memory of the NAND device.

11. The method of claim 10, wherein retrieving the key using the index value includes:
extracting a logical address from the logical address portion; and
combining the logical address with the index value to locate the key.

12. The method of claim 8, wherein the operation is a write request, and wherein performing the operation includes:
  writing data of the write request to a second physical address;
  invoking a physically unclonable function (PUF) to create a random key;
  storing the random key in a data structure with a second index value;
  invoking the reversible function on the second physical address using the random key to produce a second location value; and
  providing the second location value and the second index value to an initiator of the write request.

13. The method of claim 12, wherein storing the random key in the data structure includes generating the second index value.

14. The method of claim 12, wherein the PUF is implemented in hardware of a controller of the NAND device.

15. A machine readable medium including instructions for host accelerated operations in managed NAND devices, the instructions, when executed by processing circuitry of a machine, cause the processing circuitry to perform operations comprising:
  receiving an operation at a controller of a NAND device, the operation including address data with a logical address portion and a physical address portion;
  extracting an index value from the physical address portion;
  extracting a location value from the physical address portion;
  retrieving a key using the index value;
  invoking a reversible function using the index value and the location value to produce a physical address; and
  performing the operation using the physical address.

16. The machine readable medium of claim 15, wherein the reversible function performs permutation on the key and the location value to produce the physical address.

17. The machine readable medium of claim 15, wherein retrieving the key using the index value includes using the index value to locate the key in a table store in volatile memory of the NAND device.

18. The machine readable medium of claim 17, wherein retrieving the key using the index value includes:
  extracting a logical address from the logical address portion; and
  combining the logical address with the index value to locate the key.

19. The machine readable medium of claim 15, wherein the operation is a write request, and wherein performing the operation includes:
  writing data of the write request to a second physical address;
  invoking a physically unclonable function (PUF) to create a random key;
  storing the random key in a data structure with a second index value;
  invoking the reversible function on the second physical address using the random key to produce a second location value; and
  providing the second location value and the second index value to an initiator of the write request.

20. The machine readable medium of claim 19, wherein storing the random key in the data structure includes generating the second index value.

21. The machine readable medium of claim 19, wherein the PUF is implemented in hardware of a controller of the NAND device.

* * * * *